(Model.)

M. F. E. STADTMUELLER.
HAY LOADER.

No. 320,188. Patented June 16, 1885.

WITNESSES:

INVENTOR:
M. F. E. Stadtmueller
BY
ATTORNEYS.

UNITED STATES PATENT OFFICE.

MAX F. E. STADTMUELLER, OF CASTLE GROVE, IOWA.

HAY-LOADER.

SPECIFICATION forming part of Letters Patent No. 320,188, dated June 16, 1885.

Application filed April 16, 1884. (Model.)

*To all whom it may concern:*

Be it known that I, MAX F. E. STADTMUELLER, of Castle Grove, in the county of Jones and State of Iowa, have invented a new and useful Improvement in Hay-Loaders, of which the following is a full, clear, and exact description.

Reference is to be had to the accompanying drawings, forming a part of this specification, in which similar letters of reference indicate corresponding parts in all the figures.

Figure 1:
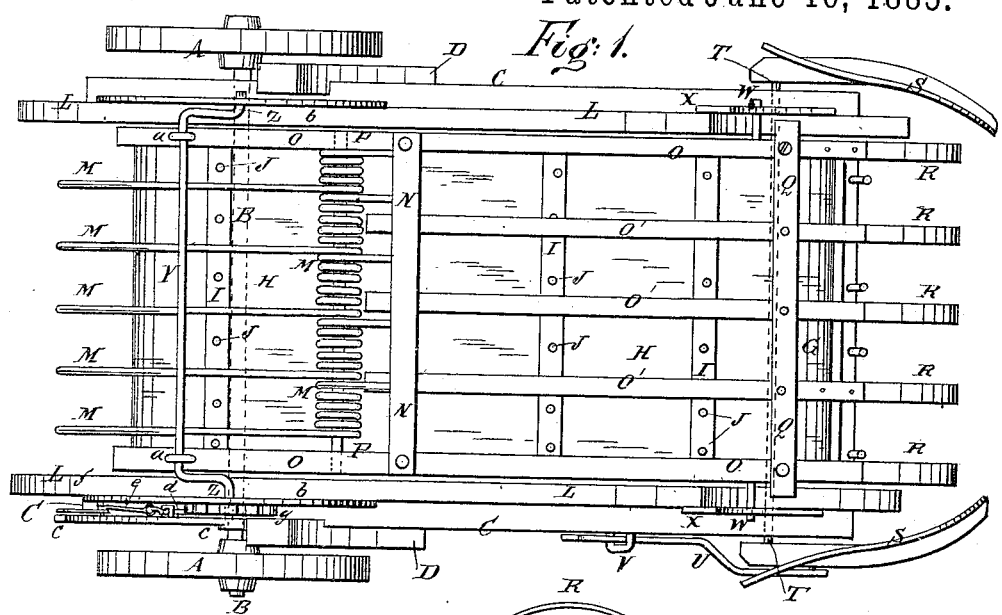
Figure 2:
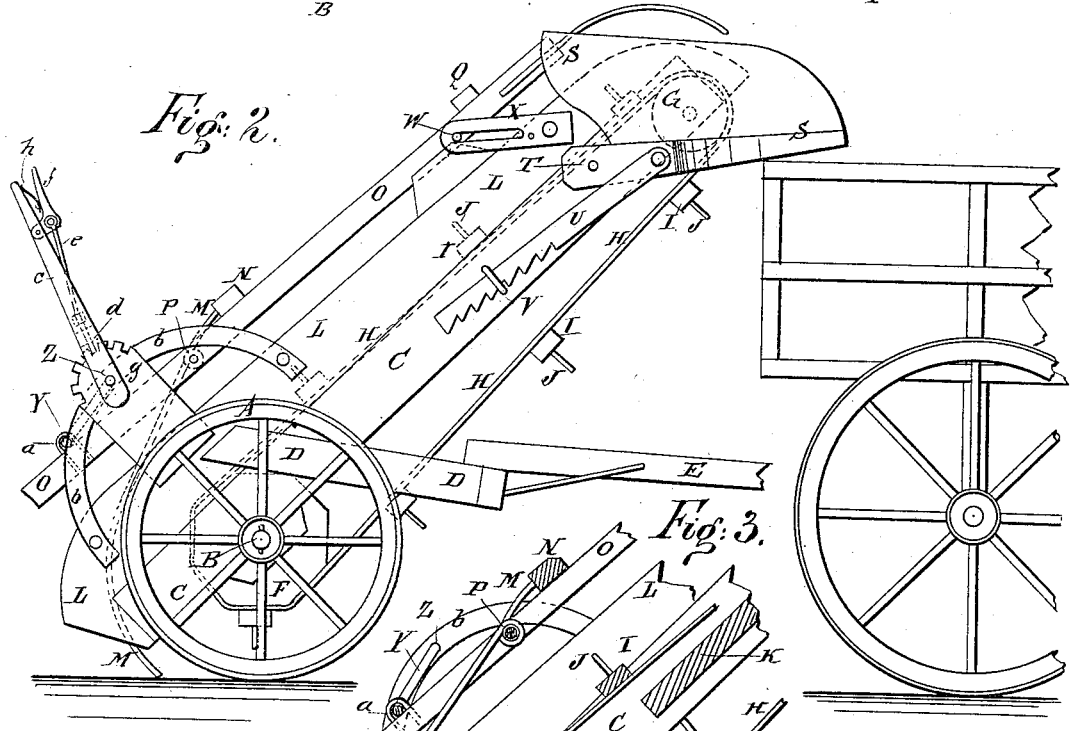
Figure 3:
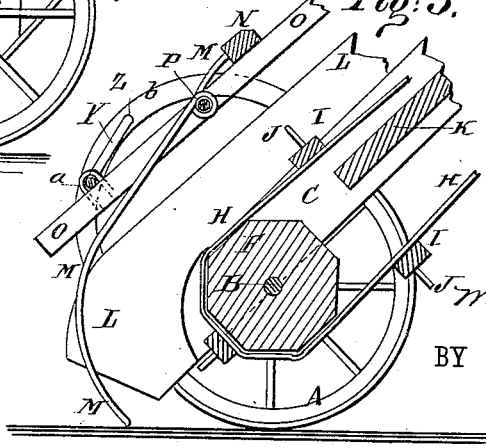

Figure 1 is a plan view of my improvement. Fig. 2 is a side elevation of the same. Fig. 3 is a sectional elevation of the lower part of the same.

The object of this invention is to facilitate collecting hay in the field and loading it upon wagons.

The invention consists in the construction and arrangement of parts, as will be hereinafter fully described and claimed.

The loader is provided at its upper end with curved guide-bars and adjustable guide-wings having hinging-rod and adjustable bar and keeper for holding and adjusting the said wings.

The guard-frame carries the rake-teeth, and is connected with the side boards of the elevator at its upper end by pins and slotted bars, and at its lower end by a crank-shaft and its supports and operating-lever, whereby the said guard-frame and rake-teeth can be readily adjusted, as will be hereinafter fully described.

A are the drive-wheels, which are rigidly attached to the axle B. The axle B revolves in bearings attached to the lower sides of the lower parts of the side bars of the inclined main or elevator frame C.

To the lower part of the side bars of the frame C, a little above the axle B, are attached the side bars of the horizontal or draw frame D, to the center of the forward end of which is attached the rear end of the draw-bar or tongue E. The forward end of the tongue E is designed to be connected with the rear axle of the hay-wagon by a clevis or other suitable means.

To the axle B is attached a polygonal shaft, F, and to the upper end of the frame C is pivoted a corresponding shaft, G. Around the shafts F G passes an endless apron, H, to which, at suitable distances apart, are attached cross-bars I, provided with teeth J, to carry the hay up the elevator.

The upper part of the endless apron H, that carries the hay, is kept from sagging by a stationary platform-apron, K, attached to the side bars of the frame C.

The hay is kept from falling off at the side edges of the apron H by the side boards, L, attached to the side bars of the frame C.

M are the rake-teeth, the upper ends of which are attached to the cross-bar N. The ends of the cross-bar N are attached to the side guard-bars, O. The teeth M, at a little distance from the cross-bar N, are coiled around a rod, P, the ends of which are attached to the side guide-bars, O. The guide-bars O, at a little distance from their upper ends, are connected by a cross-bar, Q.

To the cross-bars N Q are attached intermediate cross-bars, O', to the upper ends of which and to the upper ends of the side guide-bars, O, are attached, or upon them are formed, downwardly-curved arms R. The bars O O' and the arms R are designed to keep the hay from being blown off the endless apron H while being carried up the elevator, and from being scattered while being dropped upon the hay-wagon. The hay is further kept from being scattered while being dropped to the hay-wagon by guard-wings S, which are attached to a rod, T, which passes through and is pivoted in bearings in the side bars of the frame C, or side boards, L. To one of the wings S, at a little distance from the rod T, is pivoted the end of the bar U, which passes through a keeper, V, attached to a side bar of the frame C. The bar U has teeth upon its lower edge to engage with the lower arm of the keeper V, to support the wings S at a greater or less height, as may be desired.

To the outer sides of the upper parts of the guard-bars O are attached pins W, which pass through slots in the upper parts of the upwardly and rearwardly inclined bars X, the lower ends of which are secured to the upper parts of the side boards, L, so that the upper parts of the guard-frame O O' N Q can be moved upward and rearward.

The rear parts of the side guard-bars, O, are connected with and hung from the long crank Y of the shaft Z by staples *a* or other suitable means, so that the rear part of the guard-frame O O' N Q and the rake-teeth M can be adjusted as the thickness of the hay to be gathered may require.

The shaft Z is journaled to supports $b$ attached to the side boards, L, or to the side bars of the frame C.

To one end of the crank-shaft Z is rigidly attached a lever, $c$, so that the said crank-shaft can be turned to adjust the rake-teeth and guard-frame by operating the said lever. The lever $c$ is locked in place in any position into which it may be adjusted by a pawl, $d$, connected by a rod, $e$, with a small bent lever, $f$, pivoted to the upper part of the lever $c$. The pawl $d$ engages with a notched catch-plate, $g$, attached to the support $b$ or to the side board, L, and is held in gear with the said catch-plate by a spring, $h$, interposed between the said lever $f$ and the lever $c$.

Having thus described my invention, I claim as new and desire to secure by Letters Patent—

1. In a hay-loader, the combination, with the frame C, side boards, L, rearward-inclined slotted arms X at the forward ends thereof, crank-shaft Z, lever $c$, a locking mechanism for said lever, the parallel guard-bars O, suspended from said crank-shaft at their rear ends, and pins W at the forward ends thereof entering the slots of arms X, rake-bars M, and cross-bars connecting the bars O, substantially as set forth.

2. In a hay-loader, the combination, with the side boards, L, the guard-frame N Q O O', and the rake-teeth, M, of the pins W, the slotted bars X, the crank-shaft Z, the supports $b$, and the locking-lever $c$, substantially as herein shown and described, whereby the said guard-frame and rake-teeth can be readily adjusted, as set forth.

MAX F. E. STADTMUELLER.

Witnesses:
TOM M. BIXBY,
JOHN STADTMUELLER.